J. F. MIRRIELEES.
LUBRICATING DEVICE FOR DRILL PRESSES AND THE LIKE.
APPLICATION FILED JULY 6, 1919.
1,398,338. Patented Nov. 29, 1921.
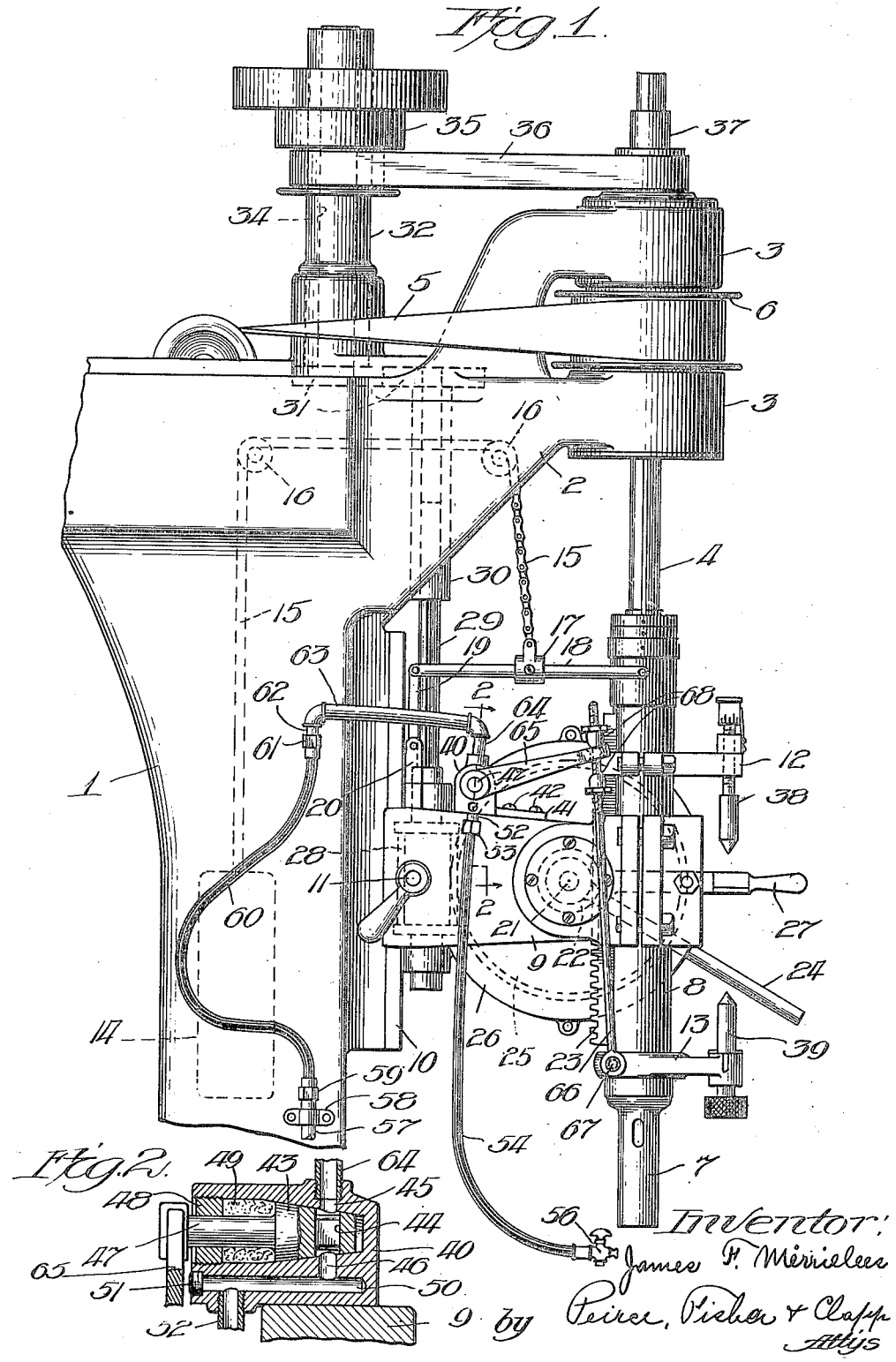

UNITED STATES PATENT OFFICE.

JAMES F. MIRRIELEES, OF CINCINNATI, OHIO, ASSIGNOR, BY MESNE ASSIGNMENTS, TO THE AVEY DRILLING MACHINE COMPANY, OF CINCINNATI, OHIO, A CORPORATION OF OHIO.

LUBRICATING DEVICE FOR DRILL-PRESSES AND THE LIKE.

1,398,338.      Specification of Letters Patent.      Patented Nov. 29, 1921.

Application filed June 6, 1919. Serial No. 302,167.

*To all whom it may concern:*

Be it known that I, JAMES F. MIRRIELEES, a citizen of the United States, and a resident of Cincinnati, county of Hamilton, and State of Ohio, have invented certain new and useful Improvements in Lubricating Devices for Drill-Presses and the like, of which the following is a specification.

The improvement relates to means for supplying oil or other lubricant to the drill of a drilling machine or to the reciprocating tool of other similar machines to thereby prevent the tool from over-heating. The invention seeks to provide a simple construction which can be readily applied to drill presses and like machines, and which is provided with means for automatically effecting the flow of lubricant during the forward or working stroke of the tool and for cutting off such flow during the idle or return stroke, and which means can be adjusted to control the flow of lubricant as desired.

The invention consists in the features of improvement hereinafter set forth, illustrated in the preferred form in the accompanying drawings and more particularly pointed out in the appended claims.

In the drawings: Figure 1 is a side elevation of a drilling machine with the present improved lubricating device applied thereto. Fig. 2 is a longitudinal section of the controlling valve on the line 2—2 of Fig. 1.

The drilling machine shown in the drawings comprises a standard 1 having a forwardly projecting head 2 at its upper end provided with bearings 3 for the drill spindle 4. A drive belt 5 for the spindle engages a pulley 6 arranged between the bearings 3 and keyed to the spindle. The spindle rotates with the pulley but is free to move vertically therethrough to effect the working and return strokes of a suitable boring tool or drill carried by a holder 7 on the lower end of the spindle.

As usual, the spindle is journaled in and is supported by a reciprocating sleeve 8 which, in turn, is vertically movable through the outer end of a guiding head 9. The head is adjustable on a guide-way 10 on the front of the standard 1 and is held in adjusted position by a clamp screw 11. The movement of the sleeve through the head is limited by upper and lower stop collars 12 and 13 mounted on the sleeve. The weight of the sleeve and spindle is counterbalanced by a weight 14 arranged within the hollow standard 1 and connected to the lower end of a chain 15. The latter passes upwardly and forwardly over two guide pulleys 16 in the upper end or head of the standard and thence downwardly to a part 17 mounted on a lever arm 18. The latter is pivoted to the upper end of the spindle sleeve and at its inner end is connected by a link 19 to lug 20 on the inner portion of the guiding head 9.

A transverse feed shaft 21 journaled in the head is provided with a pinion 22 which engages a rack 23 fixed to the sleeve. A hand lever 24 mounted on the shaft 21 affords means by which the working and return strokes of the drill spindle can be manually effected. If desired, an automatic feed may be provided for the drill spindle, similar to that shown in the John G. Hey Patent No. 1,216,689, dated February 20, 1917. For this purpose, as set forth in said patent, a worm wheel 25 arranged within a casing 26 on the guiding head 9 is loosely mounted on the feed shaft 21 and is adapted to be connected thereto by a suitable clutch under control of a lever 27. The worm wheel is driven by a worm 28 mounted upon the lower end of the vertical counter-shaft 29 which is journaled at its lower end in the adjustable guiding head 9. The upper end of the shaft telescopes within a hollow shaft or sleeve 30, the upper end of which is connected by two gears 31 to a sleeve 32 mounted on a stud shaft 34. A stepped pulley 35 on the sleeve is adapted to be connected by a belt 36 to a stepped pulley 37 on the upper end of the spindle. The clutch shifter 27 can be controlled by hand or by upper and lower trip fingers 38 and 39 carried by the stop collars 12 and 13. These trip fingers are arranged to engage and disengage the power feed mechanism at the beginning and end of the working stroke of the spindle, the return stroke being effected by the counterbalance 14, when the clutch is disengaged. Similar automatic feed mechanism is fully set forth in the patent above cited and further description thereof is unnecessary. Moreover, other feed mechanism can be employed.

The improved lubricating device or attachment comprises a valve casing 40 which is mounted on the machine frame and preferably upon the adjustable guiding head 9 for the reciprocating spindle and spindle sleeve. The valve casing in the form shown is adapted to rest upon the upper face of the guiding head and is provided with a flange 41 through which screws 42 extend for holding the same in position on the upper face of the guiding head, with one end of the casing projecting over the edge of the head, as most clearly indicated in Fig. 2. In the form shown, the valve casing is cored out to form a chamber for a conical plug valve 43 having a transverse port or passage 44 extending therethrough for connecting and disconnecting an inlet port 45 and a discharge port 46. A stem 47 for the valve extends outwardly through a perforated metal collar or disk 48 which is threaded in the outer portion of the valve chamber and holds suitable packing 49 in place about the valve stem.

The port 46 communicates with a longitudinally extending passage 50 in the lower portion of the valve casing, the outer end of which, in the form shown, is closed by a plug 51. A nipple 52 threaded into the projecting outer end of the valve casing extends downwardly therefrom and is adapted to be connected by a suitable coupling 53 to the upper end of a flexible pipe 54. The opposite end of the pipe carries a valve controlled discharge nozzle 56 which is arranged to deliver the oil or other lubricant to the drill or boring tool on the lower end of the drill spindle.

The main supply pipe 57 for the oil or other lubricant is preferably fixed to the lower portion of the standard 1 by a clamp 58 and is connected to a suitable source of supply (not shown). A coupling 59 connects the pipe 57 to the lower end of a flexible pipe 60, the upper end of which is connected by a coupling 61 to a down-turned end section 62 on the end of a rigid metal pipe 63. This pipe extends inwardly over the valve casing and is provided with a down-turned end section 64 which is threaded into the valve casing and communicates with the inlet port 45 thereof.

A crank arm 65 is fixed to the outer projecting end of the valve stem 47 and extends forwardly therefrom. Its outer end is provided with a slot through which extends a link 66. The lower end of the link is connected by a pivot pin 67 to the lower stop collar 13 on the spindle sleeve 8. The upper end of the link is provided with two nuts or abutments 68 adjustable threaded thereon and arranged on opposite sides of the outer end of the crank arm 65.

During the working stroke of the boring spindle, the crank 65 is engaged by the upper abutment and shifted to open the valve so that lubricant is supplied through the delivery pipe 54 and nozzle 56 to the tool. During the idle or return stroke the lower abutment 68 engages the crank arm and closes the valve to cut off the flow of lubricant. The automatic opening and closing of the valve is properly effected whether the movement of the tool is effected manually or automatically. The abutments 68 form a lost-motion connection between the link 66 and crank 65 and can be adjusted to open and close the valve at the proper points and also in accordance with the length of the working stroke of the drill spindle. The lubricating device is also adjustable with the head 9 which guides the tool spindle and will operate properly in different positions of the guiding head.

As set forth in the Hey patent above noted, the lower trip 39 can be thrown out of operation so that the feed of the tool support is semi-automatic. That is to say, the upper trip 38 will disengage the clutch at the end of the working stroke and the return stroke will then be effected by the counterbalance 14, but the next working stroke will not take place until the clutch is again engaged by hand. The present lubricating device is particularly valuable when the machine is thus operated, since the oil valve is opened automatically near the beginning of the stroke to feed oil and is automatically closed to shut off the flow of oil at the end of the return stroke, so that no oil is wasted while the machine is idle.

Obviously, changes may be made in the details set forth without departure from the essentials of the invention as defined in the claims.

I claim as my invention:

1. In a lubricating device for drill presses and the like, the combination with a reciprocating tool support, of a flexible pipe for delivering lubricant to the tool, a normally stationary valve casing connected to said pipe and to a source of supply, a valve in said casing, and means automatically actuated by said reciprocating support for opening and closing said valve on the working and return strokes respectively of said support, substantially as described.

2. In a lubricating device for drill presses and the like, the combination with a reciprocating tool support and means for effecting working and return strokes thereof, of a flexible pipe for delivering lubricant to the work, a valve for controlling the flow of lubricant through said pipe, and actuating members having an adjustable lost-motion connection interposed between said valve and said support for opening and closing said valve upon the working and return strokes respectively of said support, substantially as described.

3. In a lubricating device for drill presses and the like, the combination with a reciprocating tool support and means for effecting working and return strokes thereof, of a flexible pipe for delivering lubricant to the work, a valve casing connected to said pipe and to a source of supply, an oscillating valve in said casing, a crank connected to said valve, and a link having two adjustable abutments thereon connecting said crank to said reciprocating support and arranged to open and close said valve upon the working and return strokes respectively of said support, substantially as described.

4. In a lubricating device for drill presses, the combination with the frame, a drill spindle, and a reciprocating sleeve wherein said spindle is mounted, of a flexible pipe having a valve controlled discharge nozzle for delivering lubricant to the drill, a valve casing mounted on the frame and connected to said pipe and to a source of supply, an oscillating valve in said casing, a crank connected to said valve, a link pivoted to said sleeve and extending through an opening in said crank, and two collars adjustably threaded on said link and arranged to engage and actuate said crank to open and close said valve, substantially as described.

5. In a lubricating device for drill presses and the like, the combination with a reciprocating tool support and an adjustable guiding head for said support, of a flexible pipe for delivering lubricant to the tool, a valve mounted on said head and connected to said pipe, a flexible supply pipe connected to said valve, and means automatically actuated by said support for opening and closing said valve on the working and return strokes respectively of said support, substantially as described.

6. In a lubricating device for drill presses and the like, the combination with a reciprocating tool support and an adjustable guiding head for said support, of a flexible pipe for delivering lubricant to the tool, a valve casing mounted on said adjustable head and connected to said pipe, a flexible supply pipe connected to said casing, a valve therein, and adjustable connections between said support and said valve for opening and closing the latter upon the working and return strokes respectively of said support, substantially as described.

7. In a lubricating device for drill presses and the like, the combination with the frame, adjustable guiding head thereon, reciprocating tool support carried by said head and means for effecting the working and return strokes of said support, of a flexible pipe for delivering lubricant to the tool, a valve casing mounted on said adjustable head, a flexible supply pipe connected to said casing, a valve therein, and actuating members having an adjustable lost-motion connection interposed between said support and said valve for opening and closing the latter upon the working and return strokes respectively of said support, substantially as described.

8. In a lubricating device for drill presses and the like, the combination with the frame, the adjustable guiding head thereon and the reciprocating drill spindle and sleeve carried by said head, of a flexible pipe for delivering lubricant to the drill, a valve casing on said adjustable head, a flexible supply pipe connected to said casing, an oscillating valve in said casing, a crank connected to said valve, and a link interposed between said crank and said sleeve and having a pivotal connection with one of said parts and an adjustable lost-motion connection with the other, substantially as described.

9. In a lubricating device for drill presses and the like, the combination with a reciprocating tool support and automatic means for effecting working and return strokes thereof, of a flexible pipe for delivering lubricant to the tool, a normally stationary valve casing connected to said pipe and to a source of supply, a valve in said casing for controlling the flow of lubricant through said pipe, and adjustable connections between said valve and said reciprocating tool support for automatically opening and closing said valve.

10. In a lubricating device for drill presses and the like, the combination with a reciprocating tool support and means for effecting working and return strokes thereof, of a pipe for delivering lubricant to the work, a valve for controlling the flow of lubricant through said pipe, and adjustable actuating devices controlled by said reciprocating tool support arranged to automatically open said valve at the beginning of the working stroke of said support and to automatically close the same upon its return stroke.

JAMES F. MIRRIELEES.